UNITED STATES PATENT OFFICE.

GEORGE R. KING, OF NEW BRIGHTON, NEW YORK.

COMPOUND TO RESTRAIN THE SETTING OF PLASTER.

SPECIFICATION forming part of Letters Patent No. 368,594, dated August 23, 1887

Application filed May 14, 1887. Serial No. 238,193. (No specimens.)

*To all whom it may concern:*

Be it known that I, GEORGE R. KING, a resident of New Brighton, county of Richmond, and State of New York, and a citizen of the United States, have made a new and useful Invention in Compounds to Restrain the Setting of Plaster and the Like; and the following is a full, clear, and exact description of the same, which will enable others to practice the same.

In the use of plaster-of-paris and other materials which set by reason of the same causes, it is very desirable to be able to restrain the setting action, so that a slow setting may be had, when desired, instead of the usual rapid setting of the material. To accomplish this, plaster has been mixed with glue-water; but this gave very uneven results, and on the whole was not satisfactory. It has also been attempted to mix powdered glue with plaster and then mix the two powdered materials with water; but this gives a still more unsatisfactory result, and in practice proved totally useless.

My invention consists in a process and a product. The latter can be mixed with plaster or other materials that have a kindred setting action, and the quantity of my material that is used will govern the setting action of the plaster or like material with which it is mixed.

I proceed in the practice of my process as follows: I take any stone or stone-like material—such as marble, chalk, plaster, or the like. (I prefer marble, preferably white)—and I powder it so that it will pass through, say, a No. 16 bolting-cloth. I then (although this is not an essential step in the process or in the production of my article) submit this powdered mass to a temperature of from 250° to 400° Fahrenheit. I next dissolve, preferably, glue in water, though many other animal, gelatinous, or vegetable glutinous substances will do. I prefer, however, glue. I next mix the finely-ground stone-powder with the glue-water. More or less glue can be used, as desired. To make what I call a "stronger product," more glue is used; to make a less strong product, less glue is used—say two pounds of glue may be dissolved in about a pailful of water. This fluid mass will wet about a certain amount of ground stone, not much more or less, so as to form a pasty mass. This pasty mass I then dry, say by artificial heat at a temperature of about 200° Fahrenheit, and the result will be a comparatively hard stone-like mass. Various drying methods may be used. I next powder this stone-like mass by grinding or in any other way, and preferably bolt it through about a No. 16 mesh cloth. This mass may again be heated, if desired, to drive off any further moisture, such heating being advantageous rather than hurtful, but not being an essential step in my process. When this is done, my article, which I call a "restrainer," is ready for use. It may be used alone if an exceedingly slow-setting mass is desired, or it may be added to any plaster or like material in any desired quantity to restrain the setting action. Thus if my restrainer, for example, is added to common plaster-of-paris, even in such small quantities as to amount to one pound of the restrainer to fifty pounds of plaster, a restraining effect will be had. It is preferable in all cases to mix the powdered restrainer with the powdered plaster or equivalent substances while both are in the dry and finely-powdered condition and then add the water. This restrainer is very useful in making a hard surface for walls and the like, and for numerous other purposes.

What I claim, and desire to secure by Letters Patent, is—

1. The process herein described, which consists in mixing with water containing a gelatinous or glutinous substance a powdered stone, hardening the same into a stone-like mass, and then regrinding this stone-like mass, substantially as described.

2. The process herein described, which consists in mixing with glue dissolved in water an artificially-dried powder made by grinding stone, allowing the same to harden, and then regrinding the mass, substantially as described.

3. The process herein described, which consists in mixing with glue-water powdered marble, drying the same into a hard mass, and regrinding the same, substantially as described.

4. As a new article of manufacture, a restrainer, substantially as herein described, consisting of glue and ground stone, combined in the manner set forth.

GEO. R. KING.

Witnesses:
THOS. BALE,
H. BIGNELL.